Figure 1:
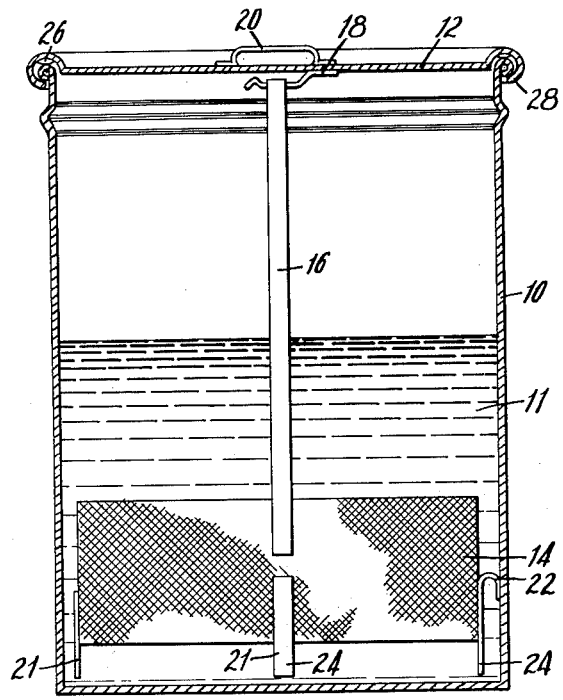

Feb. 18, 1964 W. L. KENNEDY 3,121,438
OPEN HEAD CONTAINER AND COVER THEREFOR
Filed Jan. 16, 1961

INVENTOR.
WILLIAM L. KENNEDY
BY
ATTORNEY

United States Patent Office 3,121,438
Patented Feb. 18, 1964

3,121,438
OPEN HEAD CONTAINER AND COVER THEREFOR
William L. Kennedy, Darien, Conn., assignor to Union Carbide Corporation, a corporation of New York
Filed Jan. 16, 1961, Ser. No. 82,852
1 Claim. (Cl. 134—135)

The invention relates in general to an open head container and cover therefor, and has for its principal object the provision of an airtight, readily resealable container.

Open head containers are widely used for transporting small quantities of liquids. These containers are generally cylindrical in shape, and are permanently sealed at one end. The other end is provided with a removable cover which usually consists of a substantially flat, circular plate with numerous lugs attached to its periphery and with a gasket attached to its under side near the periphery. The gasket is shaped so that it conforms to the upper rim of the container and fits between the container and the cover when the cover is in place. When the cover is in place and all the lugs are bent down against the container, the gasket is compressed between the container and the cover, and an airtight seal is thereby effected.

Due to the large number of individual lugs which have to be bent, a seal produced by bending all the lugs down is both difficult and time-consuming. This is particularly true when the cover is being resealed on the container by hand to prevent losses of the liquid by evaporation, and by splashing during local transportation from job to job. In actual practice, therefore, the cover is usually placed on the container without bending the lugs down. Although the weight of the cover helps to effect a seal between the cover and the container, a seal sufficient to prevent liquid losses by evaporation and by splashing is not provided in this way, especially if the liquid is highly volatile.

The container and cover of the invention avoid the above difficulties by means of a weight suspended from a hook attached to the under side of the cover. This weight increases the force exerted on the gasket between the container and the cover and thereby provides a better seal. The size of the weight can be varied to effect a seal sufficient for the particular requirements accompanying the use of any one container. A handle attached to the outer side of the cover provides for easy removal of the cover from the container even though the weight is suspended from the cover.

If the open head container has a dipping basket in it, as in many cleaning solution containers, the dipping basket may be engaged with the hook to serve as the weight on the cover. Dipping baskets usually have a bail which can be easily engaged with the hook. If the weight of the basket is not sufficient for a good seal, additional weights placed in the basket will increase the force on the gasket to that required for a good seal.

Figure 2:
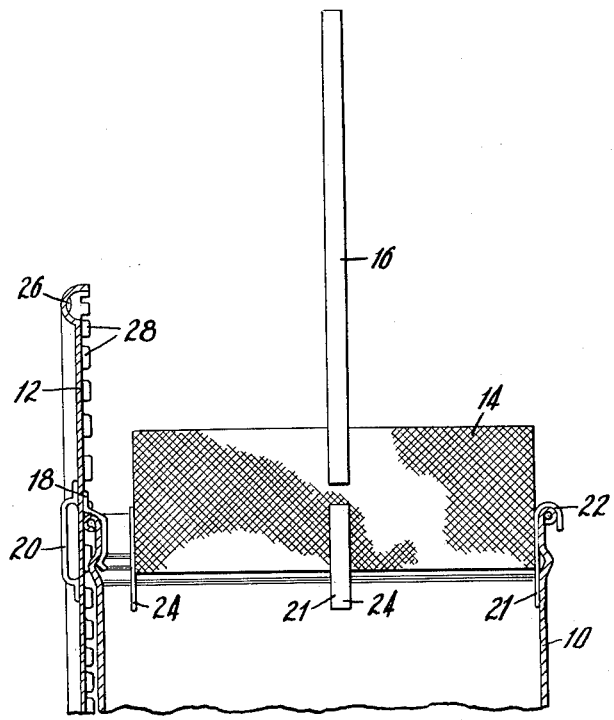

In the accompanying drawing:

FIG. 1 is a vertical sectional view of an open head container and cover therefor embodying the invention; and FIG. 2 is also a vertical sectional view of an open head container and cover therefor embodying the invention, but with the various pieces in an open position.

In FIG. 1, an open head container 10 is shown containing a solution 11. A cover 12, comprising a substantially flat, circular plate, closes the open end of the container 10, and a meshed dipping basket 14 is provided within said container 10. The basket 14 is provided with a substantially semicircular bail 16 which extends toward the top of the container 10 where it is engaged with a hook 18 attached to the under side of the cover 12. Thus, the basket 14 is suspended from the hook 18.

The cover 12 has a handle 20 attached to its outer surface. Metallic strips 21 are vertically attached to the basket 14 at four equally spaced locations on its periphery. The top part of at least one of these strips 21 is overturned to form a basket hook 22, which permits the basket 14 to be hung on the top rim of the container 10, as shown in FIG. 2. This provides for easy placement of articles in the basket 14 without any splashing of the solution 11. The bottom ends of these strips 21 extend below the bottom edge of the basket 14 and form basket feet 24. These feet 24 are of such a length that they do not touch the bottom of the container 10 when the bail 16 is engaged with the hook 18.

A gasket 26 is attached to the under side of the cover 12 and fits between the container 10 and the cover 12 to provide a sealing member therebetween. Lugs 28 are affixed to the cover 12 around its periphery and bind the cover 12 against the container 10 when the lugs 28 are bent in against the container 10. These lugs 28 can be of any of the conventional shapes, one of which is illustrated in FIG. 2.

The handle 20 permits easy removal of the cover 12, and the hook 18 permits the basket 14 to hang therefrom. The weight of the basket 14 hanging from the cover 12 compresses the gasket 26 between the container 10 and the cover 12 to form a good seal therebetween. The weight compressing the gasket 26 may be increased even more by heavy objects added to the basket 14 or by heavy objects suspended directly from the hook 18.

The addition of the hook 18 and the handle 20 also allows the cover 12 to be used as a shield during movement of the basket 14. In this instance, an operator, by engaging the bail 16 with the hook 18, can move the basket 14 by grasping only the handle 20. The cover 12, therefore, is always between the operator and the solution 11 and thereby shields the operator from any splashing of the solution 11.

The hook 18 can also be used to hang the cover 12 on the rim of the container 10, as shown in FIG. 2. If the cover 12 is always so placed when removed from the container 10, the dangers of misplacing the cover 12 and of soiling it will be minimized.

What is claimed is:

In combination, an open head container, a resealable cover therefor, and a metallic dipping basket within said container; said cover comprising a substantially flat, circular plate provided with lugs around its periphery, a gasket attached to said plate and situated so as to fit between said cover and the upper rim of said container, a handle attached to the outer side of said plate, and a hook attached directly to the under side of said plate; said basket having a bail which engages said hook, said basket thereby being suspended from said cover and thereby sealing said cover securely on said container, and said basket having a hook attached to its outside near its bottom to permit said basket to be suspended on said upper rim of said container when placing articles therein.

References Cited in the file of this patent

UNITED STATES PATENTS

| | | |
|---|---|---|
| 259,740 | Ams | June 20, 1882 |
| 557,112 | Covel | Mar. 31, 1896 |
| 1,426,400 | McCarty | Aug. 22, 1922 |
| 2,374,535 | Gibson | Apr. 24, 1945 |
| 2,627,276 | Eggleton | Feb. 3, 1953 |
| 2,738,900 | Wenger | Mar. 20, 1956 |
| 2,853,084 | Lipshaw | Sept. 23, 1958 |

FOREIGN PATENTS

| | | |
|---|---|---|
| 6,592 | Great Britain | of 1903 |